United States Patent [19]

Miller et al.

[11] Patent Number: 4,625,781

[45] Date of Patent: Dec. 2, 1986

[54] SAW CARRIER ASSEMBLY FOR TREE FALLING APPARATUS

[75] Inventors: Jerry L. Miller; Frank E. Jaenicke, both of Prince George; Quentin C. Lodge, Fort St. James, all of Canada

[73] Assignee: Northern Manufacturing Limited, Prince George, Canada

[21] Appl. No.: 739,175

[22] Filed: May 30, 1985

[51] Int. Cl.$^4$ ............................................. A01G 23/08
[52] U.S. Cl. ...................... 144/34 R; 83/788; 83/790; 30/385; 30/379.5; 144/336
[58] Field of Search ............ 144/2 Z, 3 D, 34 R, 144/218, 335, 336; 83/790, 788; 30/383, 384, 385, 379, 379 S

[56] References Cited

U.S. PATENT DOCUMENTS

| | | | |
|---|---|---|---|
| 789,512 | 5/1905 | Waller | 144/34 R X |
| 1,342,213 | 6/1920 | Hanson et al. | 144/34 R X |
| 3,102,562 | 9/1963 | Horncastle | 144/34 |
| 3,542,100 | 11/1970 | Choat | 144/34 |
| 3,854,510 | 12/1974 | Matlik | 144/34 R |
| 3,872,901 | 3/1975 | Bernard | 144/34 R |
| 4,434,827 | 3/1984 | Franklin | 144/336 |
| 4,467,849 | 8/1984 | Denis | 144/34 R |
| 4,491,163 | 1/1985 | Kurelek | 144/336 |

Primary Examiner—W. D. Bray
Attorney, Agent, or Firm—Carver & Co.

[57] ABSTRACT

A saw carrier assembly has a loop of saw chain and a powered sprocket to drive the saw chain. The assembly also has a saw chain journalling structure having a rotatable circular periphery cooperating with the saw chain to mount the chain to rotate therewith to reduce friction and to resist sawing forces. The saw journalling structure and sprocket cooperate with a saw support structure so that the chain saw extends as a loop around the sprocket and journalling structure. The journalling structure has a thickness less than the kerf produced by the saw to permit a portion of the saw journalling structure to pass into the kerf with negligible interference therewith. This enables a tree to be cut using a saw journalling structure of slightly less diameter than diameter of the tree where it is cut, and reduces frictional losses normally associated with a fixed chain saw support bar.

18 Claims, 7 Drawing Figures

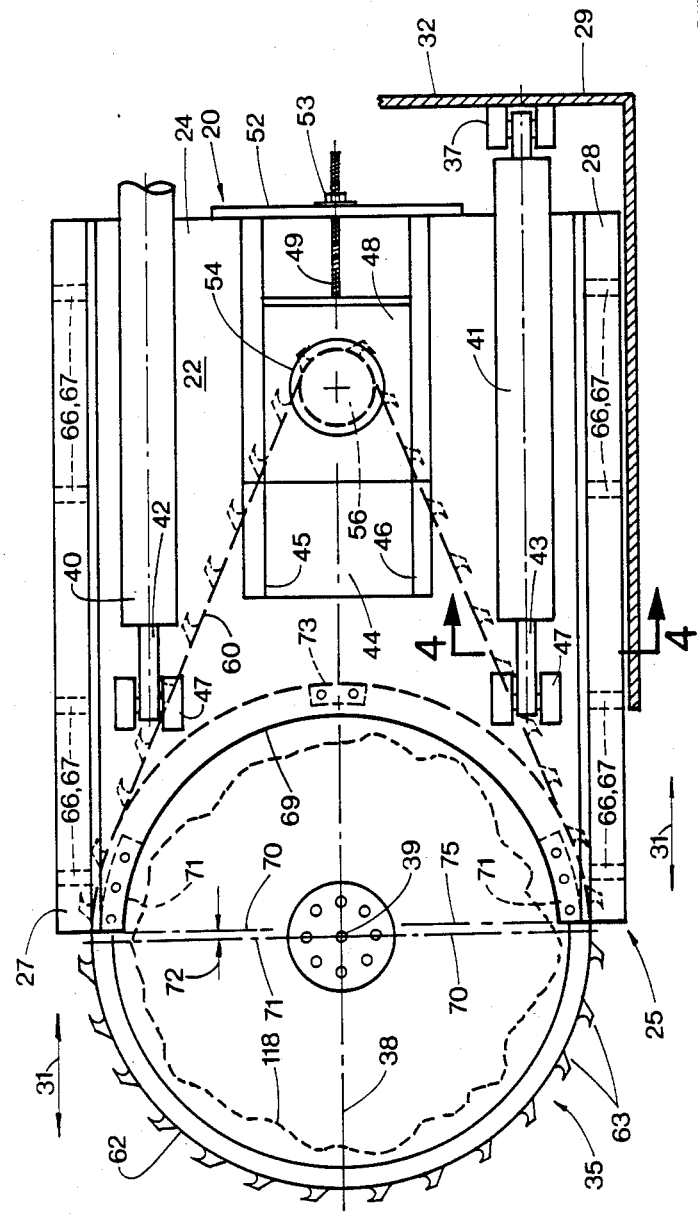
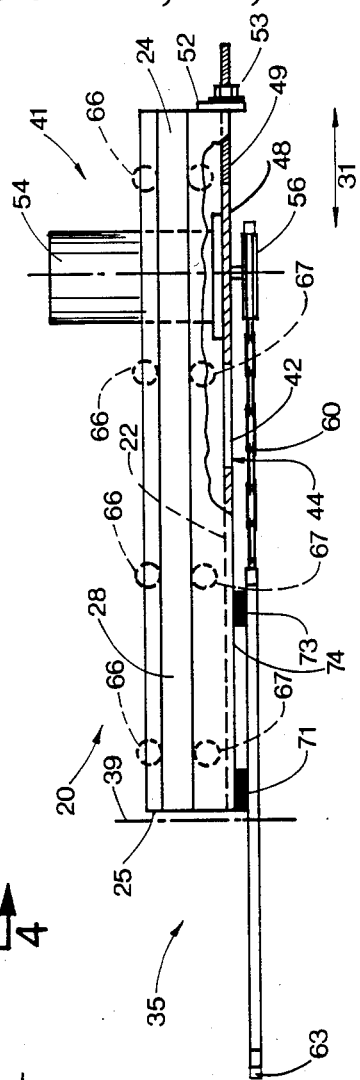
FIG. 2
FIG. 3

SAW CARRIER ASSEMBLY FOR TREE FALLING APPARATUS

BACKGROUND OF THE INVENTION

1. Field of the Invention

The invention relates to a saw carrier assembly particularly adapted for, but not limited to, mounting with a feller buncher or other tree falling apparatus.

2. Prior Art

Apparatus for falling trees, such as the feller bunchers, have been used for many years and commonly include a pair of spaced grapples mounted on a post carried on a vehicle. A tree severing means, such as shears, a movable chain saw, or a movable circular saw, is mounted below the lower grapple so as to sever an upper portion of the tree from a lower portion, while concurrently supporting the upper portion of the tree. Difficulties associated with the prior art apparatus increase as the size of the tree increases. The inventor has found that friction associated with the conventional chain saw tends to limit the size of the tree that can be cut with this type of apparatus, particularly when cutting trees having butt diameters greater than 60 cm.

Means to reduce friction associated with the conventional chain saw have been tried. For example, U.S. Pat. No. 789,512 (Waller) discloses a chain saw in which a chain passes around a pair of spaced arms carrying free wheeling sheaves. However, the span of the chain between the sheaves is unsupported and this would likely deflect under the cutting load. U.S. Pat. No. 1,342,213 (Hanson et al) discloses a chain saw in which an idler wheel is mounted at an outer end of the frame or bar so as to reduce friction of the saw passing around the end. However, the chain passes through a hollow ball which is designed to be located at the center of the tree to provide the fulcrum for swinging the saw. A loop of intermediate chain supports the main saw chain to reduce friction. U.S. Pat. No. 3,872,901 (Bernard) discloses a cutting device having a pair of spaced concentric cutting discs carrying a saw chain therebetween. Each cutting disc has teeth to produce its own kerf, and the chain saw removes material remaining between the kerf so as to produce a single wide cut. It would seem that a very large kerf is produced, with a corresponding large expenditure of energy.

SUMMARY OF THE INVENTION

The present invention reduces difficulties and disadvantages of the prior art by providing a saw carrier assembly which can be mounted on a conventional tree falling apparatus, with or without associated grapples for holding the tree. The saw carrier assembly uses a conventional cutting saw chain, in which friction of the saw chain passing around the end of the apparatus is reduced by mounting it on a rotatable journalling structure, which is provided with ball bearings to reduce friction. A conventional saw chain is used and the invention produces a normal sized kerf. Furthermore, the portions of the saw chain actually cutting the wood are supported concurrently by the journalling structure, thus eliminating deflection of the chain, so as to maintain an accurate cut and concurrently reducing the friction by use of low friction bearings. Furthermore, the journalling structure for the saw has a particular diameter and is mounted in such a way as to permit cutting of a tree having a butt diameter only slightly less than the diameter of the journalling structure.

A saw carrier assembly according to the invention is adapted to produce a kerf in a work piece, the assembly having a loop of saw chain and sprocket drive means powering the saw chain. The assembly is characterized by a saw support means and a saw chain journalling means. The saw support means mounts the sprocket drive means to drive the saw chain, and the saw journalling means has a circular periphery cooperating with the saw chain to mount the chain to rotate therewith to reduce friction and to resist sawing forces. The saw journalling means cooperates with the saw support means so that the saw chain extends as a loop around the drive means and the journalling means. The journalling means has a thickness less than the kerf to permit a portion of the saw journalling means to pass into the kerf with negligible interference therewith.

In one embodiment of the saw carrier assembly, the saw journalling means has a rotatable circular outer plate having the circular periphery to cooperate with the saw chain, and the circular plate has a central bearing boss rotatable therewith. The saw journalling means has an annular plate having an inner annular portion which cooperates with the central bearing boss to journal the outer plate thereon, the annular plate being non-rotatably secured to the support means. Preferably, the outer plate has an intermediate portion having an annular recess generally complementary to the annular plate. Also, the annular plate and the intermediate portion of the outer plate have respective thicknesses such that the sum of the two thicknesses is less than thickness of the kerf so as to reduce interference therewith.

A tree falling apparatus mounted on a movable vehicle can be adapted for mounting the saw carrier assembly of the invention. The saw carrier assembly has a guide means and a feed means for feeding the saw support means into the tree. Grapple arms of a feller buncher can be included for gripping a tree prior to and after cutting.

A detailed disclosure following, related to drawings, describes one preferred embodiment of the invention, which is capable of expression in structure other than that particularly described and illustrated.

DESCRIPTION OF THE DRAWINGS

In the drawings:

FIG. 2 is a simplified fragmented side elevation of the saw carrier assembly as used in FIG. 1, some portions being removed, FIG. 3 is a simplified fragmented top plan view of the assembly of FIG. 2, also showing portions of a support box feed and means.

DETAILED DISCLOSURE

FIG. 1

Figure 1:
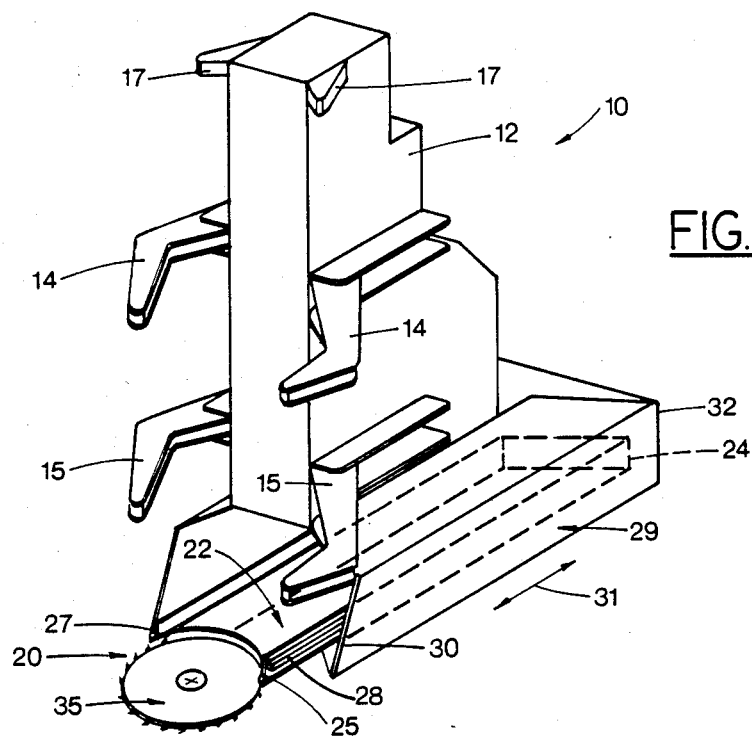
FIG. 1 is a simplified fragmented perspective of a portion of a feller buncher apparatus utilizing a saw carrier assembly according to the invention.

An apparatus 10 for falling trees is adapted to be mounted on a movable vehicle, not shown, so as to permit movement relative to trees. The apparatus has a post 12 carrying upper and lower pairs of grapple arms 14 and 15 respectively which are actuated by actuating means, not shown, to swing about spaced vertical axes so as to grip a tree therebetween, prior to falling. Tree guide means 17 are provided at an upper end of the post serve as a means to center the post relative to the tree, prior to engagement of the tree by the grapple. The provision of guide means, grapple arms and the post can vary considerably, depending on the kind of operation, and in some cases can be eliminated completely, depending on the type of tree to be cut. In any event, the falling apparatus as above described is generally old and is subject to many variations well known in the trade. Usually, the post and grapple arms are portions of a feller buncher apparatus, which includes a tree severing means such as chain saw, a circular saw or shear blade means. The severing means is movable to approach the tree and is usually located adjacent the lower portion of the apparatus.

A saw carrier assembly 20 according to the invention is fitted at a lower portion of the post 12 and is adapted to sever the tree, once the tree has been gripped by the grapple means. The saw carrier assembly 20 includes a support plate 22 having inner and outer ends 24 and 25 respectively. Opposite side portions of the plate 22 cooperate with spaced parallel marginal guide rails 27 and 28 which are supported by rollers, see FIG. 4, to support the assembly 20 within a support box 29 mounted adjacent a lower end of the post 12. The box 29 has an open end 30 to receive the plate 22 and an opposite closed end 32. The rollers permit axial movement of the assembly 20 relative to the box 29 per double headed arrow 31. A saw journalling means 35 is mounted adjacent the outer end 25 of the plate, and is described in greater detail with reference to FIGS. 5 and 6.

Figure 4:
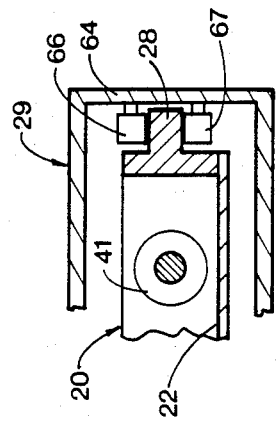
FIG. 4 is a simplified fragmented section on line 4—4 of FIG. 3.

FIGS. 2 through 4

The saw carrier assembly 20 has a horizontal longitudinal axis 38 which passes through a vertical main rotational axis 39 of the saw journalling means 35. A pair of spaced hydraulic feed cylinders 40 and 41 have respective cylinder bodies connected adjacent the closed end 32 of the box 29, one connection 37 being shown for the cylinder 41 only. The cylinders 40 and 41 have respective piston rods 42 and 43 extending axially therefrom and parallel to the axis 38, the rods having outer ends connected to the plate 22 by the brackets 47 for movement with the plate. The cylinders 40 and 41 have strokes to provide sufficient feed in the axial direction of arrow 31 for the saw carrier assembly 20, length of the stroke being a little less than diameter of the journalling means 35.

The support plate 22 has an elongated opening 44 adjacent the inner end 24, the opening having a pair of spaced parallel side walls 45 and 46 which slidably mount a motor mounting plate 48 therebetween. A threaded shaft 49 cooperates with the plate 48 and a cross member 52 is secured adjacent the end 24. An adjustment nut 53 on the shaft 49 cooperates with the member 52, and the plate 48 carries a hydraulic motor 54 having an output shaft carrying a drive sprocket 56 thereon. Clearly, a rotation of the adjustment nut 53 moves the plate 48, and with it the sprocket 56, along the longitudinal axis 38 so as to provide longitudinal adjustment of the sprocket. A loop of saw chain 60, shown diagrammatically, has cutting teeth 63 and passes around an outer portion 62 of the periphery of the journalling means 35 and around the drive sprocket 56. Clearly, adjustment of the net 53 adjusts tightness of the saw chain 60 as is well known in the trade.

A previously stated, portions of the box 29 are provided with rollers to support the saw guide assembly 20. Referring specifically to FIG. 4, the box 29 has a side plate 64 which supports a pair of vertically spaced rollers 66 and 67, which are journalled on respective roller spindles which extend rigidly inwardly from the plate 64. Adjacent portions of the rollers 66 and 67 are spaced apart to receive the marginal guide rail 28 therebetween so as to permit relatively free longitudinal movement of the saw carrier assembly. As seen in broken line in FIG. 2, a plurality of upper rollers 66 are spaced axially along the guide rail 28, with a similar and complementary plurality of lower rollers 67 spaced below the guide rail 28, and preferably directly below respective upper rollers. The guide rails 27 cooperate with similar rollers 66 and 67 mounted on an opposite side plate of the box 29. Clearly, extension and retraction of cylinders 40 and 41 causes the guide rails 27 and 28 to pass between respective rollers to provide an essentially low friction sliding movement for the saw journalling means. Clearly, the marginal guide rails 27 and 28 and the spaced rollers 66 and 67 serve as guide means cooperating with the saw support means to permit movement of the saw support means along the feed axis, that is the axis 38, which is disposed normally to the main rotational axis 39. This permits relative axial movement between the saw support means and the guide means so as to feed the saw relative to the tree. It can be seen that the hydraulic cylinders 40 and 41 are extensible and retractable means cooperating with the guide means and the saw support means to produce the relative axial movement between the saw support means and the guide means. Other means to produce the advancing feed movement, and an opposite retracting movement of the saw journalling means can be substituted.

The outer end 25 of the plate 22 has a generally concave edge 69 disposed symmetrically about the longitudinal axis 38, and disposed so as to be concentric with the axis 39 of the journalling means, and generally adjacent an inner portion of journalling means. A pair of laterally spaced outer spacer means 71 and an inner spacer means 73 located on the axis 38 are provided adjacent the concave edge 69 and cooperate with the saw journalling means 35 as will be described with reference to FIG. 6. The spacer means are sandwiched between the journalling means 35 and a lower surface 74 of the plate 22 and have openings, see FIGS. 5 and 6, to accept undesignated bolts which secure the journalling means 35 to the plate 22. This provides clearance for the saw chain 60 to pass adjacent the support as will be described with reference to FIGS. 5 and 6. A chord 75, disposed normally to the axis 38, interconnects extreme outer ends of the plate 22 adjacent the spacers 71 and is spaced from a diameter 70 of the journalling means 35 by a spacing 72. The spacing 72 can be as small as practicable, i.e. 2–3 cm, to provide sufficient support for the journalling means 35.

FIGS. 5–7

Figure 5:
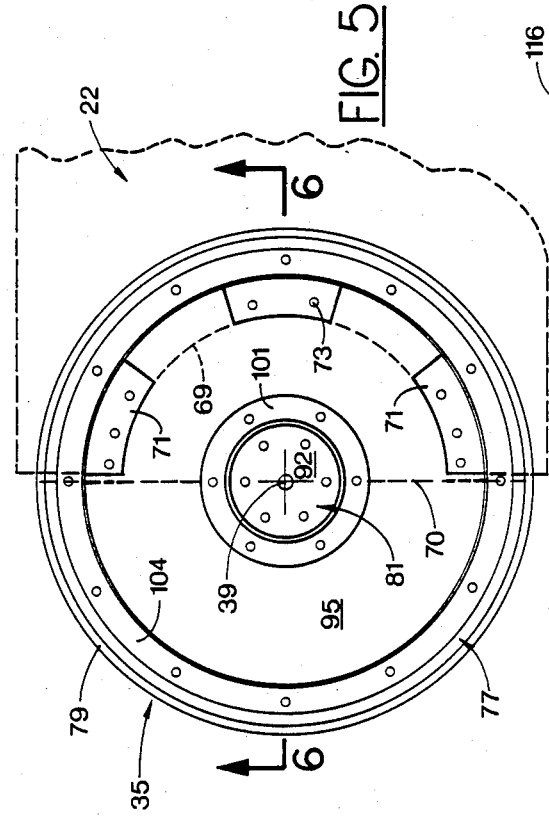
FIG. 5 is a top plan of saw chain journalling means of the carrier assembly of FIG. 2, showing portions of mounting means.
Figure 6:
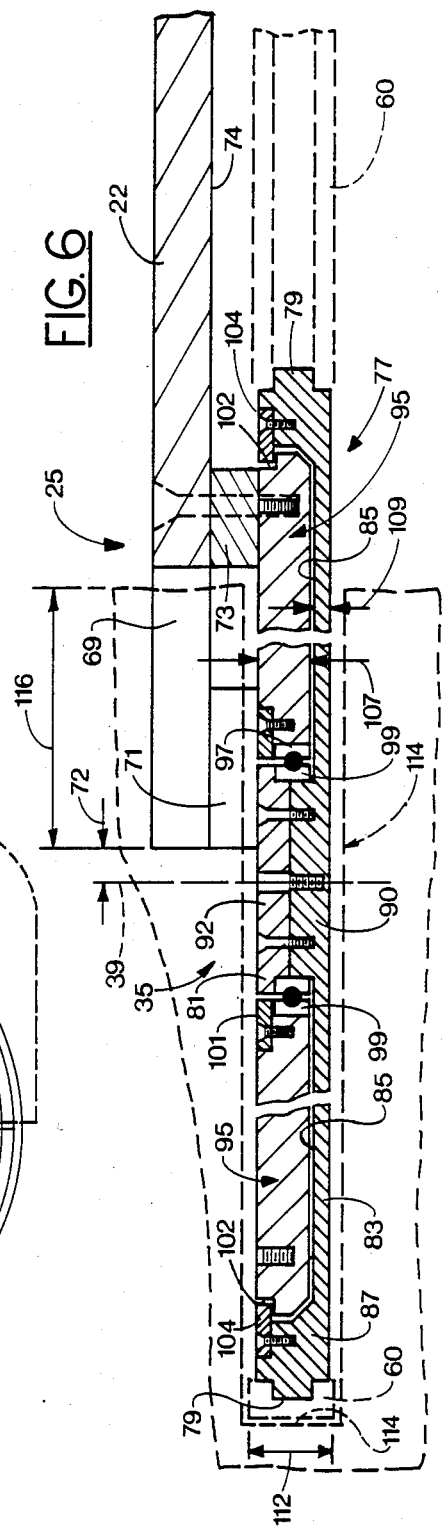
FIG. 6 is a simplified fragmented section on line 6—6 of FIG. 5.

The journalling means 35 is shown secured to the surface 74 of the outer end 35 of the support plate 22, shown in broken outline in FIG. 5, and in section in FIG. 6. The spacer means 71 and 73 provide clearance for the chain 60, shown in broken outline in FIG. 6, which is also spaced from and disposed below the lower surface 74 of the plate 22. The journalling means 35 has a rotatable circular outer plate 77 having a rotatable circular periphery 79 with a suitable cross-section to cooperate with the saw chain 60. The periphery 79 is generally cylindrical and does not have teeth to engage rollers of the chain 60, thus contrasting with some prior art structure. The plate 77 has a central bearing boss 81 rotatable therewith and disposed concentrically with the axis 39. The outer plate has an intermediate portion 83 having an annular recess 85 defined partially by a peripheral portion 87 carrying the circular periphery 79, and a circular inner portion 90 which is a portion of the central bearing boss 81. The central bearing boss 81 also has a circular retaining cap 92 secured to the inner portion 90 with undesignated bolts. The journalling means 35 also has annular plate 95 having an inner annular portion 97 with cooperates with the central bearing boss 81 to journal the outer plate thereon. The annular plate itself is connected, through the spacer means 71 and 73 to the plate 22, and thus is non-rotatably secured to the support means, thus providing the clearance for the saw chain as previously described.

A ball bearing assembly 99 is positioned between and cooperates with the central bearing boss 81 and the inner annular portion 97 of the annular plate 95 so as to permit rotation between, and to reduce bearing friction between, the annular plate and the outer plate. An inner race of the ball bearing assembly 99 is retained by being sandwiched between the retainer cap 92 and the circular inner portion 90. An outer race of the bearing assembly is secured to the annular plate 95 by an inner annular retaining plate 101. An outer periphery of the annular plate 95 has an annular groove 102 to receive an inner lip of an outer annular retaining plate 104 which is secured to the peripheral portion 87. Clearly, the bearing assembly 99, the retaining cap 92 and the retaining plates 101 and 104, together with suitable clearances as required, permit rotation between the fixed annular plate 95 and the rotatable outer plate 77 about the axis 39, and yet resists axial movement between the annular plate and the circular outer plate. As best seen in FIG. 6, an outer edge of the spacer 73 is flush with an adjacent edge of the groove 102 in the outer edge of the annular plate 95. Similarly, as seen in FIG. 5, outer edges of the spacers 71 are also flush with the outer edge of the plate 95. It can be seen that the journalling means 35 is a relatively high precision item, and the ball bearing assembly 99 and clearance between the plate 95 and the peripheral portion 87 are protected by the retaining cap and retaining plates to reduce ingress of sawdust and other foreign matter. Preferably, there should be a clearance of the order of 3–4 mm between the plate 95 and the intermediate portion 83, and a radial clearance of about 0.8 mm between the plate 95 and the peripheral portion 87.

It can be seen that the intermediate portion 83 of the outer plate has the annular recess 85 generally complementary to the annular plate 95 so as to provide a close fit therein. Of particular importance, the annular plate 95 and the intermediate portion 83 of the outer plate 77 have respective thicknesses 107 and 109 such that the sum of these two thicknesses plus clearance is less than overall thickness 112 of the saw chain. Preferably, when assembled as shown in FIG. 6, upper surfaces of the annular plate 95 and outer plate 77, i.e. the upper surfaces of the portion 87, the plates 101 and 104 and the cap 92, are essentially flush with each other. The saw chain produces a kerf, shown in broken outline as 114 in FIG. 6, which has a width essentially equal to width of the saw chain, which is clearly greater than sum of the two thicknesses 107 and 109 plus clearance. Thus, the saw journalling means can pass completely into the kerf produced by the saw chain, with negligible interference therewith apart from normal shifting of the saw journalling means within the kerf. When located centrally within the kerf, there is adequate clearance on either side of the saw journalling means to permit the saw journalling means to pass into the tree to a position greater than diameter of the saw journalling means, i.e. to permit the axis 39 to pass into the tree to a point limited by a portion of the tree contracting the concave end 69 of the plate 22. This has particular advantage when cutting trees having a butt diameter that is approaching in size the diameter of the journalling means itself. A radius of the tree adjacent the end 69 is designated 116 in FIGS. 6 and 7, and the approximate position of a tree of maximum diameter that can be cut is shown in broken outline and designated 118 in FIGS. 3 and 7.

OPERATION

The apparatus 10, mounted on a suitable vehicle (not shown), is driven to approach a particular tree for falling. The saw carrier assembly 20 is retracted into the support box 29 to permit the apparatus to approach the tree closely without interference therewith. The grapple arms 14 and 15 are actuated, and together with guide means 17, are used to position the tree generally centrally of the grappling means and generally parallel to the post 12.

Figure 7:
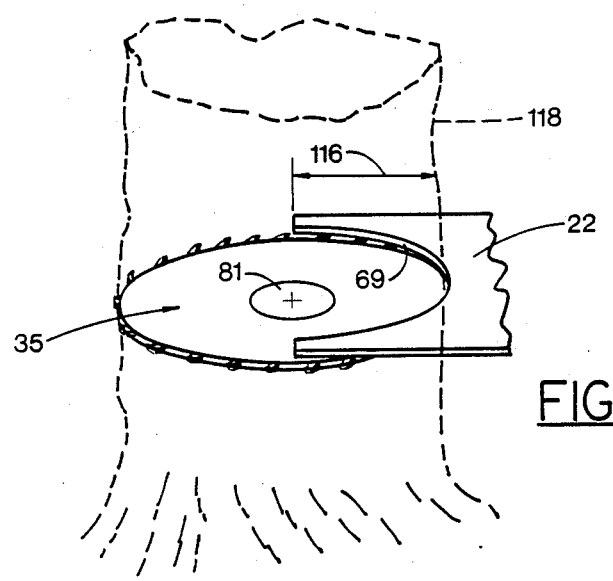
FIG. 7 is a simplified fragmented perspective of a tree being cut with the invention.

When the tree is securely located between the grapple arms, the hydraulic motor 54 is operated so as to rotate the sprocket 56, and with it the saw chain 60 and the journalling means 35. The feed cylinders 40 and 41 are then extended slowly, thus feeding the saw journalling means against the butt of the tree, with the saw chain producing the kerf as the cylinders 40 and 41 are extended. With a conventional circular saw mounted on a conventional arbor, the maximum diameter of tree butt which can be cut is somewhat less than half the diameter of the circular saw, due to interference between the tree and the arbor. With the present invention, there is no such limitation as there is no arbor adjacent the axis 39. Because the plates 95 and 77 have essentially flush upper surfaces, and the kerf is greater than thickness of the journalling means 35, the saw journalling means can penetrate the tree so that the axis 39 passes into the kerf as shown in FIG. 6. The limit of penetration is reached when a portion of the tree contacts the concave edge 69 of the plate 22 as seen in FIG. 7, thus preventing further inwards movement of the journalling means. With this invention, it has been found that a tree having a butt diameter of about 60 cm can be cut with a saw journalling means having an outer plate having a peripheral portion of 70 cm diameter.

It is added that the saw chain is a typical chain as used for industrial applications, and has a width of approximately 60 cm. Because the chain extends as an unsupported loop between the sprocket drive means and the journalling means, there is essentially negligible sliding friction of the saw chain as it is driven. Consequently, power consumed by drawing the saw chain along a conventional bar of a conventional saw chain is eliminated. This reduces considerably the power necessary for the motor 54, and reduces wear and lubrication problems correspondingly. Also, as the chain feeds smoothly on and off the toothless cylindrical periphery of the journalling means, again with essentially negligible sliding friction when making contact, wear of the chain and saw chain journalling means is correspondingly reduced. Because of the clearance between the outer plate 77 and the annular plate 95, the main source of friction associated with the journalling means appears to be that occurring in the ball bearing 99, which is relatively low. Consequently, the journalling means tends to run relatively cool when compared with other means of mounting chain saws.

In summary, it can be seen that the saw chain journalling means 35 has a circular periphery cooperating with a saw chain to mount the chain to rotate therewith to reduce friction and to resist sawing forces. The saw chain journalling means cooperate with the saw support means so that the saw chain extends as a loop around the drive means and the journalling means. The journalling means has a thickness less than the kerf to permit a major portion of the saw journalling means to pass into the kerf with negligible interference therewith.

ALTERNATIVES AND EQUIVALENTS

As described, the saw journalling means 35 has an annular plate secured to the saw carrier assembly 20, which provides a bearing for the central boss 81 of the outer plate 77. By having the annular recess 85 complementary to the annular plate 95 at the intermediate portion, in the resulting saw journalling structure the sum of the thicknesses of the plates 77 and 95 is such that the upper face of the saw journalling means is essentially flat and parallel to the lower face. Other means of mounting the journalling means can be devised to provide the advantage of an excessively deep cut, in which the axis of rotation of the journalling means can pass into the kerf without interference with the tree which contrasts with a prior art circular saw mounted on a conventional arbor.

The saw journalling means is shown mounted for axial movement along the feed axis 38 due to extension of the feed means, namely the cylinders 40 and 41. Other means to feed the journalling means into the tree can be devised. Preferably, the saw support plate 22 should be fitted to the journalling means 35 so as to present the greatest depth of cut for a given diameter of circular plate.

While the invention is described for use on a feller buncher mounted on a movable vehicle for falling trees, clearly it could be used in other applications. For example, it might be advantageous to mount the carrier assembly adjacent to a log conveyor system for cutting logs, or cants or other workpieces. In all embodiments, friction between the saw, and saw support, i.e. the periphery 79, is reduced considerably at the actual area of sawing by eliminating the stationary saw support found in a convention chain saw.

We claim:

1. A saw carrier assembly for a loop of saw chain which is adapted to produce a kerf in a workpiece, the assembly having:
   (a) a saw support means and a sprocket drive means, the support means mounting the sprocket drive means to drive the saw chain,
   (b) a saw chain journalling means mounted for rotation on the saw support means, the journalling means having a rotatable circular outer plate with a circular periphery cooperating with the saw chain to mount the chain to rotate with the outer plate so as to reduce friction and to resist sawing forces, the outer plate being spaced from the sprocket drive means and disposed relative to the drive means so that the saw chain extends as a loop around the drive means and the outer plate, the outer plate having a thickness less than the kerf to permit a portion of the outer plate to pass into the kerf with negligible interference therewith.

2. A saw carrier assembly as claimed in claim 1 in which:
   (a) the rotatable circular outer plate has a central bearing boss rotatable therewith,
   (b) the saw journaling means also has an annular plate having an inner annular portion which corporates with the central bearing boss to journal the outer plate thereon, the annular plate being non-rotatably secured to the support means.

3. A saw carrier as claimed in claim 2 in which:
   (a) the circular outer plate has an intermediate portion having an annular recess generally complementary to the annular plate,
   (b) the annular plate and the intermediate portion of the outer plate have respective thicknesses, such that sum of the two thickness is less than thickness of the kerf so as to reduce interference therewith.

4. A saw carrier assembly as claimed in claim 2 further including:
   (a) spacer means disposed between the annular plate and the saw support means to provide clearance for the saw chain to pass adjacent the support means.

5. A saw carrier assembly as claimed in claim 2 further including:
   (a) a ball bearing assembly positioned between and cooperating with the central bearing boss of the outer plate and the inner annular portion of the annular plate so as to reduce bearing friction between the annular plate and the outer plate.

6. A saw carrier assembly as claimed in claim 2 in which:
   (a) the annular plate is secured adjacent to an outer portion of the saw support means
   (b) the journalling means is adapted to resist axial movement between the annular plate and the circular outer plate.

7. A saw carrier assembly as claimed in claim 1 further including:
   (a) the saw journalling means being journalled for rotation about a main rotational axis,
   (b) guide means cooperating with the saw support means to permit movement of the saw support means along a feed axis disposed normally to the main rotation axis so as to feed the saw relative to the workpiece.

8. A saw carrier assembly as claimed in claim 7 further including:
   (a) feed means cooperating with the saw support means to cause relative axial movement between the saw support means and the guide means.

9. A saw carrier assembly as claimed in claim 8 in which:

(a) the feed means is an extensible and retractable means cooperating with the guide means and the saw support means to produce the relative axial movement therebetween when actuated.

10. An apparatus as claimed in claim 7 in which:
(a) the saw support means includes a support plate which has opposite side portions cooperating with the guide means, and has an outer end having a generally concave edge,
(b) the circular outer plate has an inner portion which is adjacent to and concentric with the concave edge of the plate.

11. An apparatus as claimed in claim 2 in which:
(a) the support means has an outer end having a generally concave edge which is adjacent to and concentric with the circular outer plate of the saw journalling means.

12. An apparatus for falling trees, the apparatus being adapted to be mounted on a movable vehicle and having a saw carrier assembly which is adapted to cooperate with a loop of saw chain to produce a kerf in a tree, the saw carrier assembly having:
(a) a saw support means and a sprocket drive means, the support means mounting the sprocket drive means to drive the saw chain,
(b) a saw chain journalling means mounted for rotation on the saw support means, the journalling means having a rotatable circular outer plate with a circular periphery cooperating with the saw chain to mount the chain to rotate with the outer plate so as to reduce friction and to resist sawing forces, the outer plate being spaced from the sprocket drive means and disposed relative to the drive means so that the saw chain extends as a loop around the drive means and the outer plate, the outer plate having a thickness less than the kerf to permit a portion of the outer plate to pass into the kerf with negligible interference therewith.

13. An apparatus as claimed in claim 12 in which:
(a) the rotatable circular outer plate has a central bearing boss rotatable therewith,
(b) the saw journaling means also has an annular plate having an inner annular portion which cooperates with the central bearing boss to journal the outer plate thereon, the annular plate being non-rotatably secured to the support means.

14. An apparatus as claimed in claim 12 further including:
(a) the saw journalling means being journalled for rotation about the main rotational axis,
(b) guide means cooperating with the saw support means to permit movement of the saw support means along a feed axis disposed normally to the main rotational axis so as to feed the saw relative to the tree.

15. An apparatus as claimed in claim 14 in which:
(a) the saw support means includes a support plate which has opposite side portions cooperating with the guide means, and has an outer end having a generally concave edge,
(b) the circular outer plate has an inner portion which is adjacent to and concentric with the concave edge of the plate.

16. An apparatus as claimed in claim 14 further including:
(a) feed means cooperating with the saw support means to cause relative axial movement between the saw support means and the guide means.

17. An apparatus as claimed in claim 13 in which:
(a) the circular outer plate has an intermediate portion having an annular recess generally complementary to the annular plate,
(b) the annular plate and the intermediate portion of the outer plate have respective thicknesses, such that sum of the two thicknesses is less than thickness of the kerf so as to reduce interference therewith.

18. An apparatus as claimed in claim 13 in which:
(a) the support means has an outer end having a generally concave edge which is adjacent to and concentric with the circular outer plate of the saw journalling means.

* * * * *